(12) United States Patent
Son et al.

(10) Patent No.: US 9,283,940 B2
(45) Date of Patent: Mar. 15, 2016

(54) MASTER CYLINDER FOR BRAKE SYSTEM

(71) Applicant: Jae Young Choi, Gunpo-si (KR)

(72) Inventors: Young Jun Son, Pyeongtaek-si (KR); Jae Young Choi, Gunpo-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 327 days.

(21) Appl. No.: 13/873,158

(22) Filed: Apr. 29, 2013

(65) Prior Publication Data

US 2013/0283779 A1 Oct. 31, 2013

(30) Foreign Application Priority Data

Apr. 30, 2012 (KR) ........................ 10-2012-0045194

(51) Int. Cl.
*B60T 11/22* (2006.01)
*B60T 11/224* (2006.01)

(52) U.S. Cl.
CPC .................................... *B60T 11/224* (2013.01)

(58) Field of Classification Search
CPC .............................. B60T 11/224; B60T 11/20
USPC .................................... 60/562, 578, 579, 581
See application file for complete search history.

(56) References Cited

U.S. PATENT DOCUMENTS

| | | | | |
|---|---|---|---|---|
| 2,954,854 A | * | 10/1960 | Eaton et al. | 188/264 F |
| 3,173,264 A | * | 3/1965 | Hazeltine | 60/563 |
| 3,312,062 A | * | 4/1967 | MacDuff | 60/561 |
| 4,072,012 A | * | 2/1978 | Kawakami | 60/562 |
| 4,445,330 A | * | 5/1984 | Melinat | 60/545 |
| 4,499,729 A | * | 2/1985 | Gaiser | 60/578 |
| 4,621,498 A | * | 11/1986 | Schaefer | 60/562 |
| 4,744,219 A | | 5/1988 | Yamamoto | |
| 5,557,935 A | | 9/1996 | Ganzel | |
| 2001/0047914 A1 | | 12/2001 | Ishida et al. | |

FOREIGN PATENT DOCUMENTS

| | | |
|---|---|---|
| CN | 1374218 | 10/2002 |
| CN | 101544228 | 9/2009 |

(Continued)

OTHER PUBLICATIONS

Office action dated Aug. 20, 2013 from corresponding Korean Patent Application No. 10-2012-0045194 and its English translation by Google Translate.
Office Action dated Mar. 24, 2015 for Chinese Patent Application No. 201310157859.9 and its English summary provided by Applicant's foreign counsel.

(Continued)

*Primary Examiner* — Thomas E Lazo
(74) *Attorney, Agent, or Firm* — Ladas & Parry, LLP

(57) ABSTRACT

Disclosed is a master cylinder for brake systems including a cylinder body including a first cylinder having a first bore therein and a second cylinder having a second bore therein, the first and second cylinders being joined together by fastening members to allow the first and second bores to communicate with each other, a first and second piston installed to move forward and backward in the first and second bores, a first hydraulic pressure chamber adapted to be pressed by the first piston arranged in the first bore, and a second hydraulic pressure chamber adapted to be pressed by the second piston arranged in the second bore. Each of the first and second bores comprises a large diameter portion expanded to an inside of the cylinder body to increase a flow rate at an initial stage of braking and a small diameter portion narrowed from the large diameter portion.

8 Claims, 2 Drawing Sheets

(56) References Cited

FOREIGN PATENT DOCUMENTS

| | | |
|---|---|---|
| DE | 10 2004 048 670 | 6/2005 |
| DE | 10 2010 040 012 | 4/2011 |
| JP | 10-016863 | 1/1998 |
| JP | 2010-125976 | 6/2010 |
| KR | 10-2002-0055441 | 7/2002 |

OTHER PUBLICATIONS

Office Action dated Jun. 13, 2014 for corresponding German Patent Application No. 10 2013 007 831.8 and its English summary provided by Applicant's foreign counsel.

* cited by examiner

MASTER CYLINDER FOR BRAKE SYSTEM

CROSS-REFERENCE TO RELATED APPLICATION

This application claims the benefit of Korean Patent Application No. 2012-0045194, filed on Apr. 30, 2012 in the Korean Intellectual Property Office, the disclosure of which is incorporated herein by reference in its entirety.

BACKGROUND

1. Field

Embodiments of the present invention relate to a master cylinder for brake systems which may improve brake feel.

2. Description of the Related Art

In a hydraulic brake system for vehicles, a master cylinder serves to generate hydraulic pressure and transfer the generated hydraulic pressure to a caliper brake installed at each wheel.

FIG. 1 shows a general tandem master cylinder. The master cylinder includes a first piston 3 and a second piston 4 installed in a bore 2 of a cylinder body 1 to be movable back and forth. The inside of the bore 2 is divided into a first hydraulic pressure chamber 5 and a second hydraulic pressure chamber 6 by the second piston 4. When the first piston 3 of the master cylinder moves forward, the first piston 3 applies pressure to the oil in the first hydraulic pressure chamber 5, and in turn the oil pressure in the first hydraulic pressure chamber 5 presses the second piston 4. Then, the second piston 4 applies pressure to the oil in the second hydraulic pressure chamber 6. Thereby, the oil in the first hydraulic pressure chamber 5 is supplied to the caliper brakes (not shown) of two wheels via a first oil discharge hole 7, and the oil in the second hydraulic pressure chamber 6 is supplied to the caliper brakes of the other two wheels via a second oil discharge hole 8.

The master cylinder is used for an F/R (front/rear) split-type vehicle or X-split (cross split)-type vehicle according to the brand or type of the vehicle. Here, the F/R-type split vehicle refers to a vehicle that controls hydraulic pressure supplied to the front wheels or the rear wheels, and the X-split-type vehicle refers to a vehicle which controls one of the front left wheel and the front right wheel and one of the rear left wheel and the rear right wheel. That is, the X-split-type vehicle controls the wheels in a cross manner that pairs one of the front wheels on one side with one of the rear wheels on the other side. The X-split type control is recently applied to a majority of vehicles since it allows one of the hydraulic chambers to create braking pressure when the other hydraulic chamber malfunctions during braking operation, thereby securing driver safety.

Meanwhile, the caliper brake installed at each wheel serves to perform braking operation by pressing a disc rotating together with the wheel. However, if the caliper brake is arranged to increase the amount of rollback to reduce drag of the caliper which occurs during braking, an excessively large amount of hydraulic oil may be needed at the initial stage of braking, resulting in degradation of initial brake feel.

A structure to increase an initial flow rate, i.e., a structure to increase an initial flow rate in the first hydraulic pressure chamber, has been proposed to address the problems described above. However, this structure may cause pressure difference between the two hydraulic pressure chambers, resulting in difference in braking force among the wheels. Therefore, it may not be applied to the X-split vehicle.

SUMMARY

Therefore, it is an aspect of the present invention to provide a master cylinder for brake systems which may increase initial flow rate to enhance brake feel.

Additional aspects of the invention will be set forth in part in the description which follows and, in part, will be obvious from the description, or may be learned from practice of the invention.

In accordance with one aspect of the present invention, a master cylinder for brake systems may include a cylinder body including a first cylinder having a first bore therein and a second cylinder having a second bore therein, the first and second cylinders being joined by fastening members to allow the first and second bores to communicate with each other, a first and second piston installed to move forward and backward in the first and second bores, a first hydraulic pressure chamber adapted to be pressed by the first piston arranged in the first bore, and a second hydraulic pressure chamber adapted to be pressed by the second piston arranged in the second bore, wherein each of the first and second bores may include a large diameter portion expanded to an inside of the cylinder body to increase flow rate at an initial stage of braking and a small diameter portion narrowed from the large diameter portion, wherein the first hydraulic pressure chamber may be divided into a first large hydraulic pressure chamber formed at a position of the large diameter portion of the first bore and a first small hydraulic pressure chamber formed at a position of the small diameter portion of the first bore, and the second hydraulic pressure chamber may be divided into a second large hydraulic pressure chamber formed at a position of the large diameter portion of the second bore and a second small hydraulic pressure chamber formed at a position of the small diameter portion of the second bore.

The first piston may be formed to have two different cross-sectional areas corresponding to the large diameter portion and small diameter portion of the first bore and may be provided with a first large piston to apply pressure to the first large hydraulic pressure chamber and a first small piston to apply pressure to the first small hydraulic pressure chamber, and the second piston may be formed to have two different cross-sectional areas corresponding to the large diameter portion and small diameter portion of the second bore and may be provided with a second large piston to apply pressure to the second large hydraulic pressure chamber and a second small piston to apply pressure to the second small hydraulic pressure chamber.

The first and second small pistons may be respectively provided with a first piston hole and a second piston hole allowing pressed oil to flow from the first and second large hydraulic pressure chambers into the first and second small hydraulic pressure chambers.

The cylinder body may be provided with a first oil introduction port to supply oil to the first hydraulic pressure chamber and a second oil introduction port to supply oil to the second hydraulic pressure chamber, wherein the first and second oil introduction ports may be respectively provided with a first check valve and a second check valve, the first and second check valves being adapted to be closed at the initial stage of braking and opened after a predetermined portion of hydraulic pressure in the first and second large hydraulic pressure chambers is discharged through the first and second piston holes.

The cylinder body may be provided with a first oil introduction inlet and a second oil introduction inlet respectively allowing the first and second oil introduction ports to respectively communicate with the first and second hydraulic pressure chambers, the first and second oil introduction inlets being formed at positions where the first and second large hydraulic pressure chambers are arranged.

The first and second hydraulic pressure chambers may be normally-open type solenoid valves or normally-closed type solenoid valves to prevent backflow of hydraulic pressure in the first and second hydraulic pressure chambers and control flow of oil supplied to the first and second hydraulic pressure chambers.

The master cylinder may be installed at an X-split type vehicle.

The fastening members may be a bolt and a nut.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
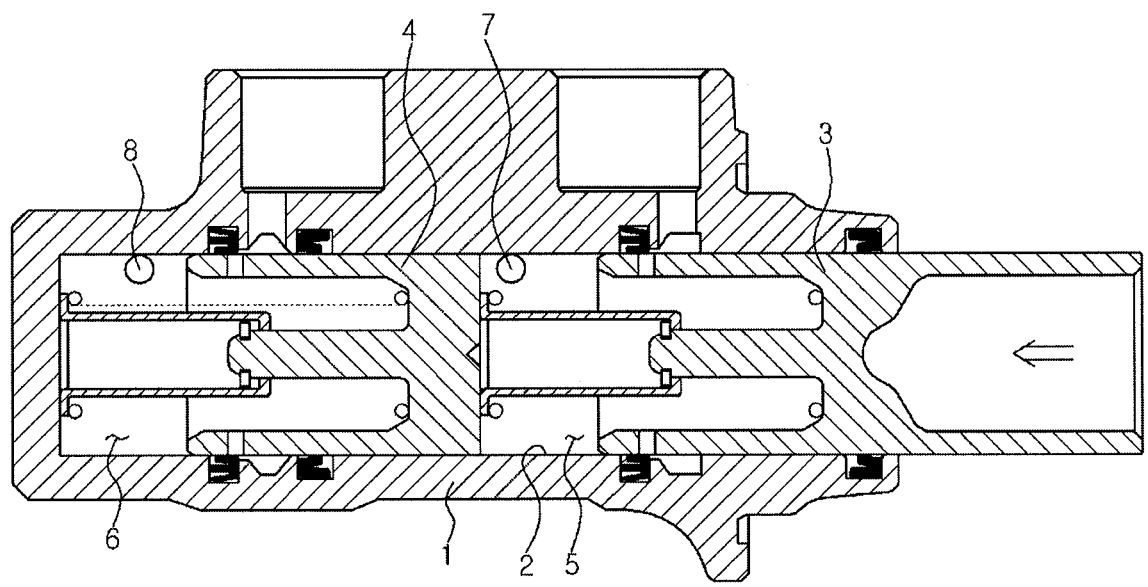
FIG. 1 is a cross-sectional view illustrating a conventional master cylinder for brake systems.

Reference will now be made in detail to the embodiments of the present invention, examples of which are illustrated in the accompanying drawings, wherein like reference numerals refer to like elements throughout. The terms used in the following description are defined taking into consideration the functions obtained in accordance with the embodiments, and the definitions of these terms should be determined based on the overall content of this specification. Therefore, the configurations disclosed in the embodiments and the drawings of the present invention are only exemplary and do not encompass the full technical spirit of the invention, and thus it will be appreciated that the embodiments may be variously modified and changed.

Figure 2:
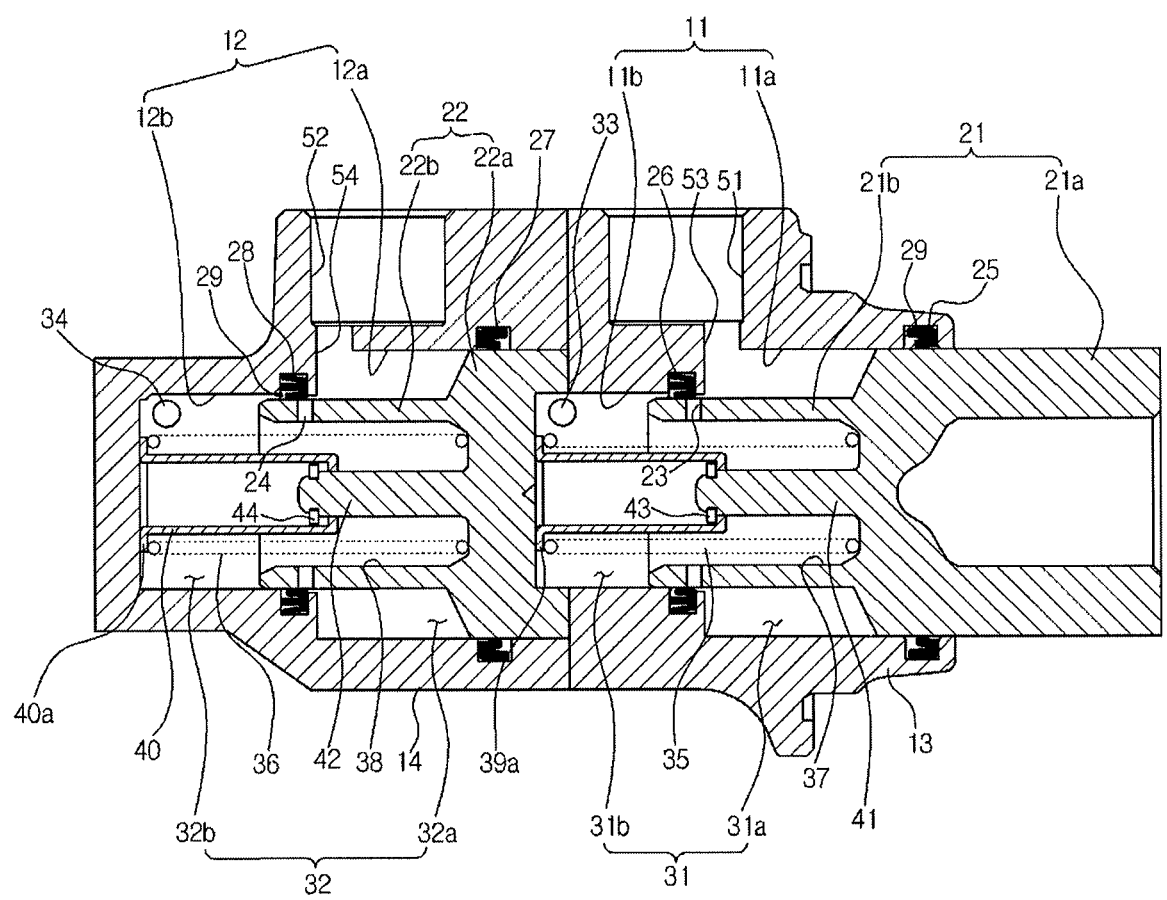
FIG. 2 is a cross-sectional view illustrating a master cylinder for brake systems according to an embodiment of the present invention.

As shown in FIG. 2, the master cylinder for brake systems according to the illustrated embodiment includes a cylinder body provided with a first cylinder 13 having a first bore 11 formed therein and a second cylinder 14 having a second bore 12 formed therein, and a first piston 21 and a second piston 22 respectively installed in the bores 11 and 12 of the cylinder body to be movable forward and backward.

The first cylinder 13 and the second cylinder 14 may be joined to each other using separate fastening members (not shown). For example, bolts and nuts may be used as the fastening members. Although not shown in FIG. 2, a flange having fastening holes may be provided to facilitate fastening of the bolts and nuts on the outer circumferential surfaces of the first cylinder 13 and the second cylinder 14 around the portion at which the first cylinder 13 and the second cylinder 14 contact each other. However, embodiments of the present invention are not limited thereto. The first and second cylinders 13 and 14 may alternatively be joined to each other through laser welding or press-fitting.

When the first cylinder 13 and the second cylinder 14 are joined to each other in various manners as above, the first and second bores 11 and 12 are arranged to communicate with each other.

The first and second bores 11 and 12 are respectively provided with a large diameter portion 11a, 12a expanded to the inside of the first and second cylinders 13 and 14 to increase initial flow rate and a small diameter portion 11b, 12b having a smaller diameter than the large diameter portion 11a, 12a. Thereby, the first and second pistons 21 and 22 are arranged to have two different cross-sectional areas corresponding to the large diameter portion 11a, 12a and the small diameter portion 11b, 12b of the first and second bores 11 and 12. The structures of the first and second pistons 21 and 22 will be described later again.

First and second sealing members 25 and 26 are installed between the inner surface of the first bore 11 and the outer surface of the first piston 21, and third and fourth sealing members 27 and 28 are installed between the inner surface of the second bore 12 and the outer surface of the second piston 22. The sealing members 25, 26, 27 and 28 are respectively accommodated in support grooves 29 formed in the inner surface of the bores 11 and 12 such that they are not moved when the pistons 21 and 22 move back and forth. Accordingly, the inner space of the first bore 11 between the first piston 21 and the second piston 22 defines a first hydraulic pressure chamber 31, and the inner space between the second piston 22 and the end inner surface of the second bore 12 defines a second hydraulic pressure chamber 32.

The first hydraulic pressure chamber 31 is divided into a first large hydraulic pressure chamber 31a formed at the position the large diameter portion 11a of the first bore 11, and a first small hydraulic pressure chamber 31b formed at the position of the small diameter portion 11b of the first bore 11. Similarly, the second hydraulic pressure chamber 32 is divided into a second large hydraulic pressure chamber 32a positioned at the large diameter portion 12a of the second bore 12, and a second small hydraulic pressure chamber 32b formed at the position of the small diameter portion 12b of the second bore 12. Thereby, the first and second pistons 21 and 22 to apply pressure to the first and second hydraulic pressure chambers 31 and 32 are formed in a stepped shape corresponding to the first and second bores 11 and 12.

More specifically, the first piston 21 includes a first large piston 21a expanded to apply pressure to the first large hydraulic pressure chamber 31a, and a first small piston 21b to apply pressure to the first small hydraulic pressure chamber 31b. The first large piston 21a and the first small piston 21b are integrated with each other to operate together. In addition, the second piston 22 includes a second large piston 22a expanded to apply pressure to the second large hydraulic pressure chamber 32a, and a second small piston 22b to apply pressure to the second small hydraulic pressure chamber 32b. The second large piston 22a and the second small piston 22b are integrated with each other to operate together. The first and second pistons 21 and 22 are formed in a two-step shape. Accordingly, in assembling the master cylinder, the first and second cylinders 13 and 14 are distinguished from each other.

Operations performed by the first hydraulic pressure chamber 31, the second hydraulic pressure chamber 32, the first piston 21 and the second piston 22 will be described again later.

To allow the oil in the first and second hydraulic pressure chambers 31 and 32 to be discharged when pressure is applied to the first and second hydraulic pressure chambers 31 and 32 by the first and second pistons 21 and 22, the cylinder body is provided with a first oil discharge hole 33 formed to the side of the first hydraulic pressure chamber 31, a second oil discharge hole 34 formed to the side of the second hydraulic pressure chamber 32. Accordingly, when the first piston 21 moves forward, the first piston 21 applies pressure to the first hydraulic pressure chamber 31, and the second piston 22 is pressed by the pressure from the first hydraulic pressure chamber 31 to apply pressure to the second hydraulic pressure chamber 32. Then, the oil in the first and second hydraulic pressure chambers 31 and 32 is discharged through the first and second oil discharge holes 33 and 34 and supplied to the caliper brakes (not shown) on the respective wheels.

A first restoring spring 35 is installed in the first small hydraulic pressure chamber 31$b$ of the first hydraulic pressure chamber 31 to return the first piston 21 when braking is terminated, and a second restoring spring 36 to return the second piston 22 is installed in the second small hydraulic pressure chamber 32$b$ of the second hydraulic pressure chamber 32. In addition, spring accommodation grooves 37 and 38 are respectively formed at the fronts of the first and second small pistons 21$b$ and 22$b$ of the first and second pistons 21 and 22 to allow the first and second restoring springs 35 and 35 to respectively move thereinto. Further, a first support 41 and a second support 42 respectively extending forward in a rod shape from the inside of the spring accommodation grooves 37 and 38 in the first and second small pistons 21$b$ and 22$b$ are provided to allow first and second retainers 39 and 40 respectively supporting the restoring springs 35 and 36 to be installed thereon. Snap rings 43 and 44 are respectively installed at the first and second supports 41 and 42 to prevent separation of the first and second retainers 39 and 40 from the first and second supports 41 and 42. That is, one end of each of the first and second restoring springs 35 and 36 is supported at the inside of a corresponding one of the spring accommodation grooves 37 and 38, and the other end thereof is supported at a corresponding one of the flange-shaped ends 39$a$ and 40$a$ of the first and second retainers 39 and 40. The first and second retainers 39 and 40 are fitted onto the outer surfaces of the first and second supports 41 and 42 to be movable forward and backward, and the separation thereof is prevented by the snap rings 43 and 44 coupled to the first and second supports 41 and 42.

First and second oil introduction ports 51 and 52 connected to the oil tank (not shown) are provided at the upper portion of the cylinder body, i.e., at the upper portions of the first and second cylinders 13 and 14, and respectively communicate with the first and second hydraulic pressure chambers 31 and 32 through the first and second oil introduction inlets 53 and 54. For this configuration, the first oil introduction inlet 53 is formed between the first sealing member 25 and the second sealing member 26, while the second oil introduction inlet 54 is formed between the third sealing member 27 and the fourth sealing member 28. More specifically, the first and second oil introduction inlets 53 and 54 communicate with the first and second large hydraulic pressure chambers 31$a$ and 32$a$. In addition, the first and second piston holes 23 and 24 allowing the spring accommodation grooves 37 and 38 and the outer surfaces thereof to communicate with each other are formed in the first and second small pistons 21$b$ and 22$b$ such that the oil introduced through the first and second oil introduction inlets 53 and 54 may flow into the first and second small hydraulic pressure chambers 31$b$ and 32$b$ through the first and second large hydraulic pressure chambers 31$a$ and 32$a$.

The first and second piston holes 23 and 24 are arranged at the lower or rear portions of the second and fourth sealing members 26 and 28 to allow the first and second oil introduction inlets 53 and 54 to respectively communicate with the first and second hydraulic pressure chambers 31 and 32 once the first and second pistons 21 and 22 are moved backward. In this configuration, the oil is allowed to flow through the first and second piston holes 23 and 24 when the first and second pistons 21 and 22 are moved backward, while flow of the oil through the first and second piston holes 23 and 24 is blocked when the first and second pistons 21 and 22 are moved forward and thus the first and second piston holes 23 and 24 are caused to be displaced from the positions of the second and fourth sealing members 26 and 28 and moved forward. Therefore, when the first and second pistons 21 and 22 are moved backward, oil may be replenished in the first and second hydraulic pressure chambers 31 and 32. When the first and second pistons 21 and 22 are moved forward, pressure may be applied to the first and second hydraulic pressure chambers 31 and 32 by the first and second pistons 21 and 22.

The first and second oil introduction ports 51 and 52 may be respectively provided with first and second check valves (not shown). The first and second check valves, which are closed at the initial stage of braking, are opened after a predetermined portion of the hydraulic pressure in the first and second large hydraulic pressure chambers 31$a$ and 32$a$ is transferred to the first and second small hydraulic pressure chambers 31$b$ and 32$b$ through the first and second piston holes 23 and 24. This operation is performed to discharge oil from the first and second large hydraulic pressure chambers 31$a$ and 32$a$ to the first and second oil discharge holes 33 and 34 via the first and second small hydraulic pressure chambers 31$b$ and 32$b$ and thereby increase the flow rate of the oil transferred to the caliper brake. As the flow rate of the oil is increased at the initial stage of braking, brake feel may be improved.

To implement this operational structure, the first and second check valves may be used as normally-open type solenoid valves or normally-closed type solenoid valves which function to prevent backflow of oil from the first and second hydraulic pressure chambers 31 and 32 to the oil tank and to control the oil flow.

Hereinafter, overall operation of the master cylinder for brake systems as above will be described.

In braking operation, braking is not effected from the moment foot force is applied to the brake pedal 10, but begins after the brake pedal 10 travels a certain distance forward. The distance that the brake pedal 10 travels from the moment the brake pedal 10 begins to be depressed to when braking begins is referred to as a lost travel section (hereinafter, "LT section"). A driver feels that brake feel is good when the LT section is short. That is, when the LT section is shortened by increasing the initial flow rate, brake feel is improved.

In the illustrated embodiment, when the first piston 21 is pressed by the initial operation of braking with the master cylinder, the first piston 21 moves forward and applies pressure to the first hydraulic pressure chamber 31, and the second piston 22 is pressed by the pressure applied to the first hydraulic pressure chamber 31 and moved forward. Thereby, pressure is applied to the second hydraulic pressure chamber 32. More specifically, once pressure is applied to the first large hydraulic pressure chamber 31$a$ by the first large piston 21$a$ of the first piston 21, this pressure causes the oil in the first large hydraulic pressure chamber 31$a$ to be supplied to the first small hydraulic pressure chamber 31$b$ through the first piston hole 23 and then supplied to the caliper brake (not shown) through the first oil discharge hole 33. In addition, as pressure is applied to the second large hydraulic pressure chamber 32$a$ by the second large piston 22$a$ of the second piston 22, this pressure causes the oil in the second large hydraulic pressure chamber 32$a$ to be supplied to the second small hydraulic pressure chamber 32$b$ through the second piston hole 24 and then supplied to the caliper brake (not shown) through the second oil discharge hole 34. As the hydraulic pressure in the first and second large hydraulic pressure chambers 31$a$ and 32$a$ is supplied to the caliper brake at the initial stage of braking, the hydraulic braking pressure is increased at the initial stage of braking to shorten the LT section, and thereby brake feel may be improved.

At this time, the first and second check valves (not shown) formed at the first and second oil introduction ports 51 and 52 are arranged in a closed state.

Subsequently, when the first and second pistons 21 and 22 moves a predetermined distance beyond the LT section, i.e., when the first and second piston holes 23 and 24 formed at the first and second small pistons 21b and 22b move past the second and fourth sealing members 26 and 28, the master cylinder performs its original function. That is, as the check valves formed at the first and second oil introduction ports 51 and 52 are opened, and the first and second pistons 21 and 22 apply pressure to the first and second small hydraulic pressure chambers 31b and 32b of the first and second hydraulic pressure chambers 31 and 32 by moving forward, the oil is supplied to the caliper brakes at the respective wheels through the first and second oil discharge holes 33 and 34, allowing braking to be performed.

Finally, when braking is released, the first and second pistons 21 and 22 are pushed back by the elasticity of the first restoring spring 35 and the second restoring spring 36, and thereby the first and second pistons 21 and 22 return to the original states thereof. As the first and second piston holes 23 and 24 are positioned at the lower or rear portions of the second and fourth sealing members 26 and 28, the oil is replenished to the first and second hydraulic pressure chambers 31 and 32.

As is apparent from the above description, a master cylinder for brake systems according to the embodiment of the present invention may increase initial flow rate in the first and second hydraulic pressure chambers, thereby improving brake feel. Therefore, the master cylinder may be applied to an X-split type vehicle with pressure difference between the first and second hydraulic pressure chambers eliminated.

In addition, a first cylinder and a second cylinder may be arranged to be joined with each other, thereby allowing easy assembly of pistons having a structure of multiple steps.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A master cylinder for brake systems comprising:
a cylinder body including a first cylinder having a first bore therein and a second cylinder having a second bore therein, the first and second cylinders being joined together by fastening members to allow the first and second bores to communicate with each other;
first and second pistons installed to move forward and backward in the first and second bores;
a first hydraulic pressure chamber adapted to be pressed by the first piston arranged in the first bore; and
a second hydraulic pressure chamber adapted to be pressed by the second piston arranged in the second bore,
wherein each of the first and second bores of the cylinder body comprises a large diameter portion expanded to an inside of the cylinder body to increase a flow rate at an initial stage of braking and a small diameter portion narrowed from the large diameter portion,
wherein:
the first hydraulic pressure chamber is divided into a first large hydraulic pressure chamber formed at a position of the large diameter portion of the first bore of the cylinder body and a first small hydraulic pressure chamber formed at a position of the small diameter portion of the first bore of the cylinder body; and
the second hydraulic pressure chamber is divided into a second large hydraulic pressure chamber formed at a position of the large diameter portion of the second bore of the cylinder body and a second small hydraulic pressure chamber formed at a position of the small diameter portion of the second bore of the cylinder body.

2. The master cylinder according to claim 1, wherein:
the first piston is formed to have two different cross-sectional areas corresponding to the large diameter portion and small diameter portion of the first bore and is provided with a first large piston to apply pressure to the first large hydraulic pressure chamber and a first small piston to apply pressure to the first small hydraulic pressure chamber; and
the second piston is formed to have two different cross-sectional areas corresponding to the large diameter portion and small diameter portion of the second bore and is provided with a second large piston to apply pressure to the second large hydraulic pressure chamber and a second small piston to apply pressure to the second small hydraulic pressure chamber.

3. The master cylinder according to claim 2, wherein the first and second small pistons are respectively provided with a first piston hole and a second piston hole allowing pressed oil to flow from the first and second large hydraulic pressure chambers into the first and second small hydraulic pressure chambers.

4. The master cylinder according to claim 3, wherein the cylinder body is provided with a first oil introduction port to supply oil to the first hydraulic pressure chamber and a second oil introduction port to supply oil to the second hydraulic pressure chamber,
wherein the first and second oil introduction ports are respectively provided with a first check valve and a second check valve, the first and second check valves being adapted to be closed at the initial stage of braking and opened after a predetermined portion of hydraulic pressure in the first and second large hydraulic pressure chambers is discharged through the first and second piston holes.

5. The master cylinder according to claim 4, wherein the cylinder body is provided with a first oil introduction inlet and a second oil introduction inlet respectively allowing the first and second oil introduction ports to respectively communicate with the first and second hydraulic pressure chambers, the first and second oil introduction inlets being formed at positions where the first and second large hydraulic pressure chambers are arranged.

6. The master cylinder according to claim 4, wherein the first and second check valves are normally-open type solenoid valves or normally-closed type solenoid valves to prevent backflow of hydraulic pressure in the first and second hydraulic pressure chambers and control flow of oil supplied to the first and second hydraulic pressure chambers.

7. The master cylinder according to claim 1, wherein the master cylinder is installed at an X-split vehicle.

8. The master cylinder according to claim 1, wherein the fastening members are a bolt and a nut.

* * * * *